United States Patent

[11] 3,552,459

| [72] | Inventor | Leslie Vadas |
| | | Los Gatos, Calif. |
| [21] | Appl. No. | 731,237 |
| [22] | Filed | May 22, 1968 |
| [45] | Patented | Jan. 5, 1971 |
| [73] | Assignee | Castle & Cooke, Inc. |
| | | Honolulu, Hawaii |
| | | by mesne assignments |

[54] DAMPED ROTARY PEELING HEAD
4 Claims, 18 Drawing Figs.

[52] U.S. Cl. .................................................. 146/6, 146/43
[51] Int. Cl. ......................................................... A23n 15/00
[50] Field of Search ................................................ 146/6

[56] References Cited
UNITED STATES PATENTS

| 3,352,337 | 11/1967 | Vadas .......................... | 146/6 |
| 3,382,900 | 5/1968 | De Back ...................... | 146/6 |

*Primary Examiner*—Willie G. Abercrombie
*Attorneys*—F. W. Anderson and C. E. Tripp ABSTRACT: A rotary head for the contour peeling of pineapples has bell crank knife arms pivotally mounted on a rotor through which the pineapples are passed for contour peeling. A torsion spring urges the knives toward the fruit and a counterweight opposes the effect of centrifugal force on the knife. A hydraulic vane type damper is connected to the knife arm at its pivot point on the rotor, for freely accommodating knife motion toward the fruit while resisting sudden outward motion of the knife.

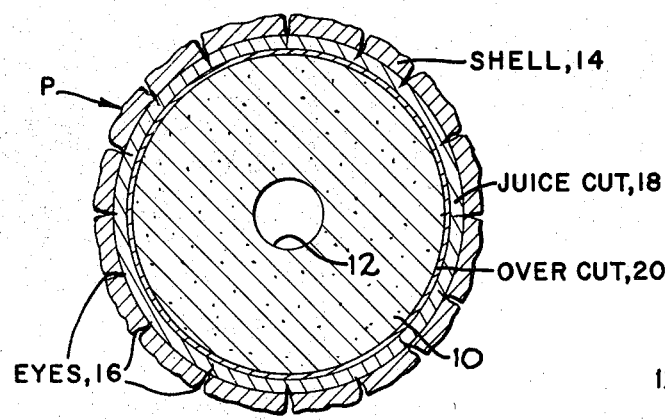
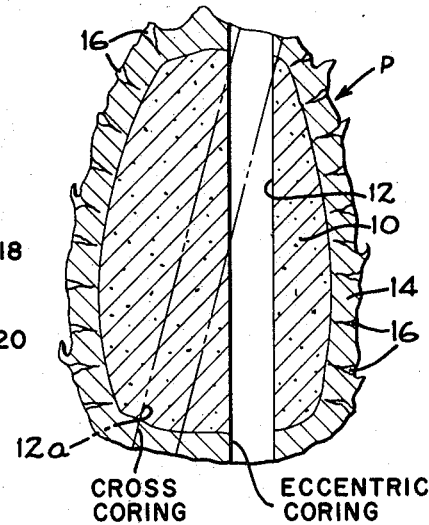
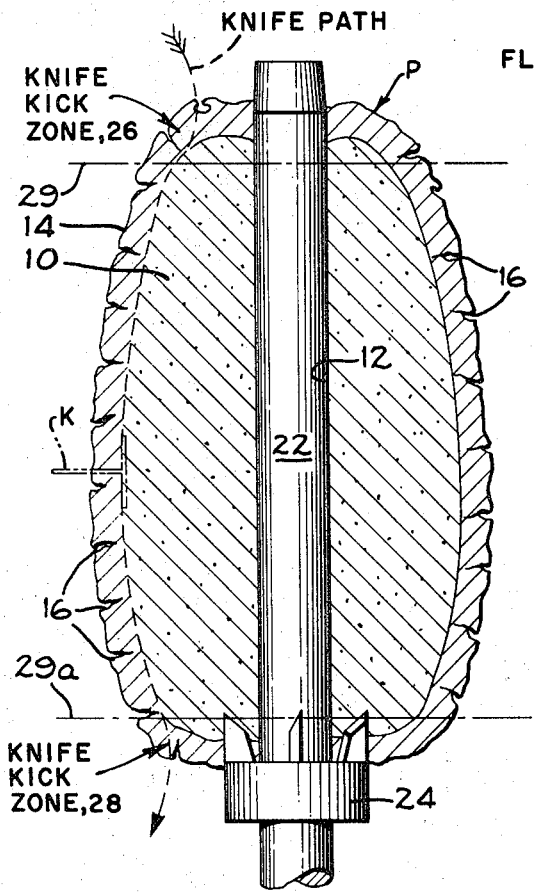
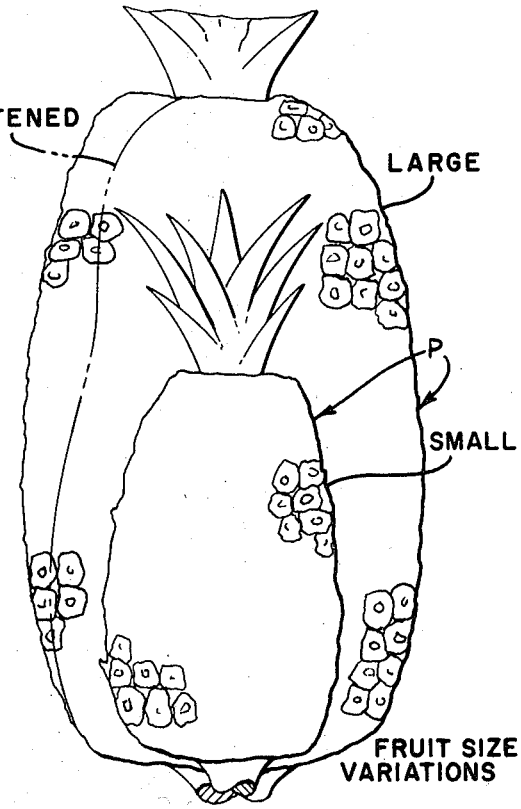

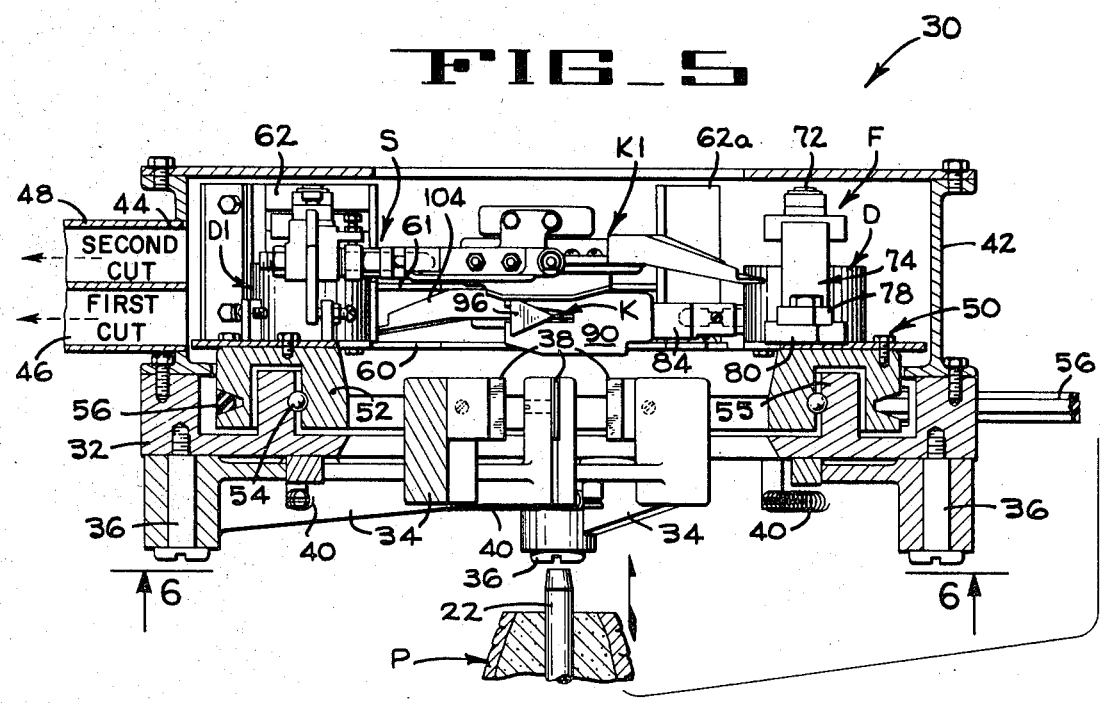
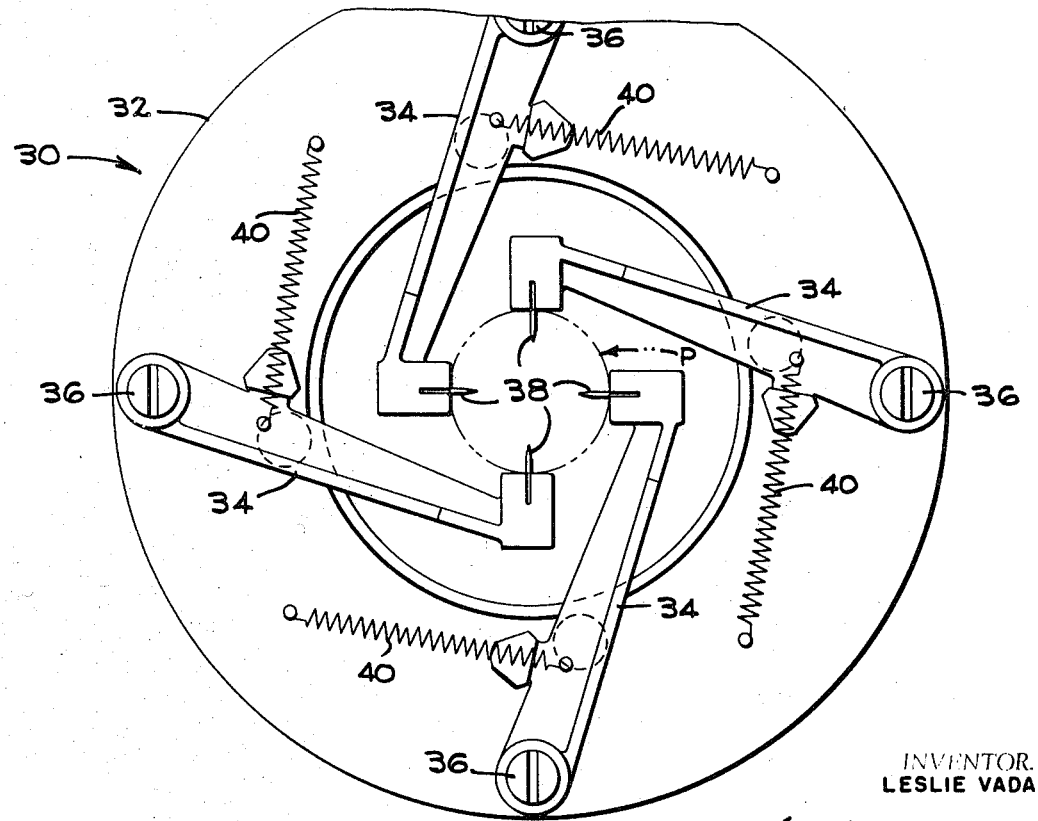

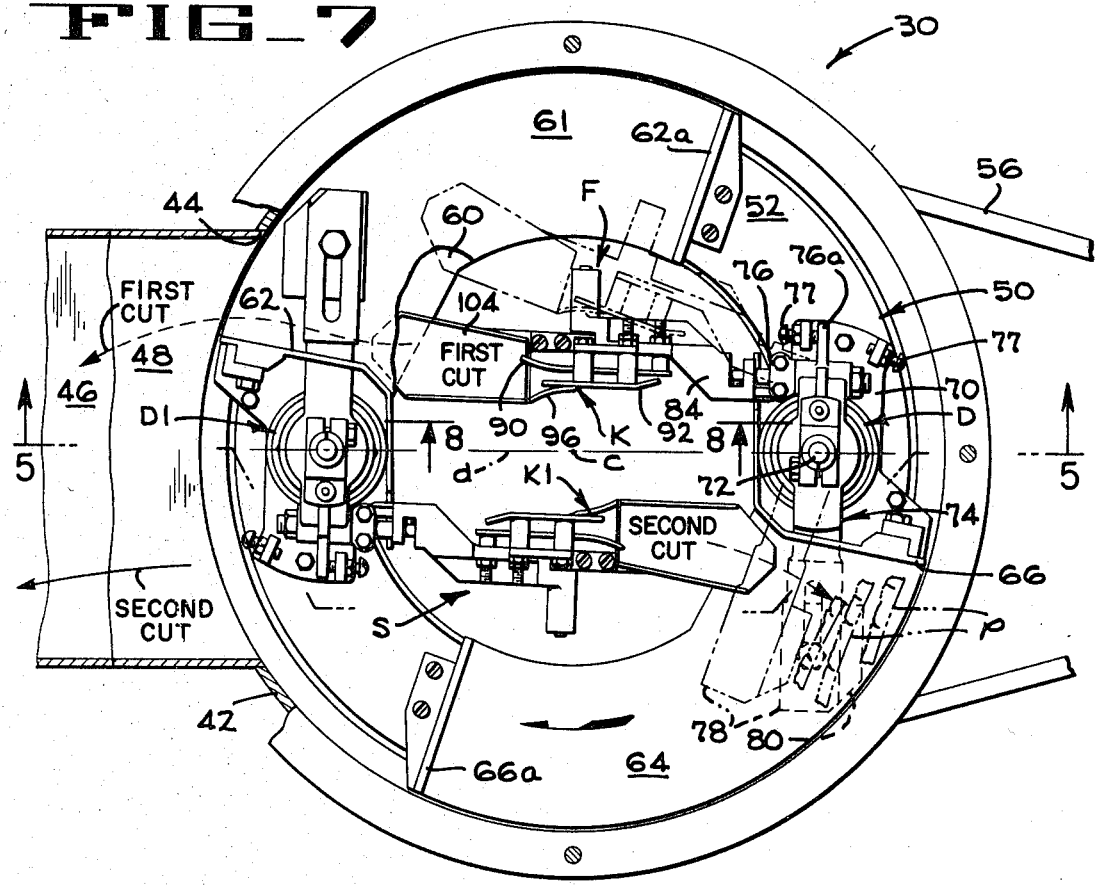
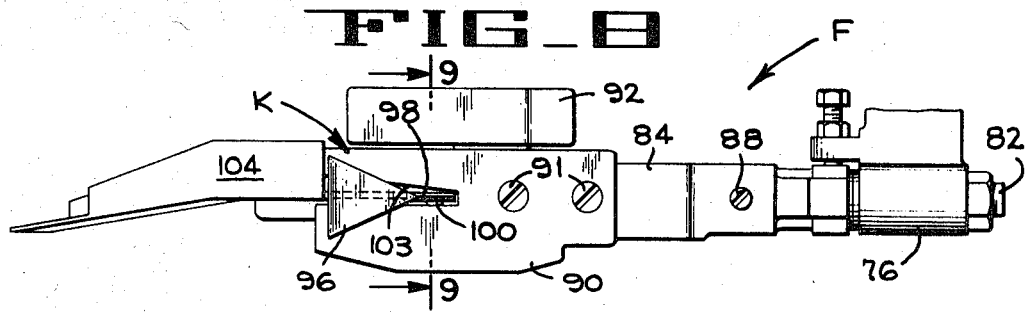
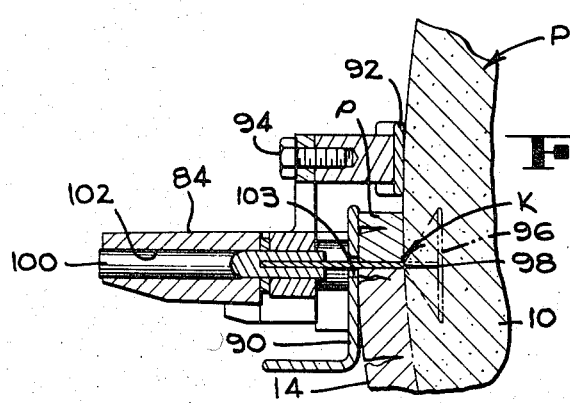

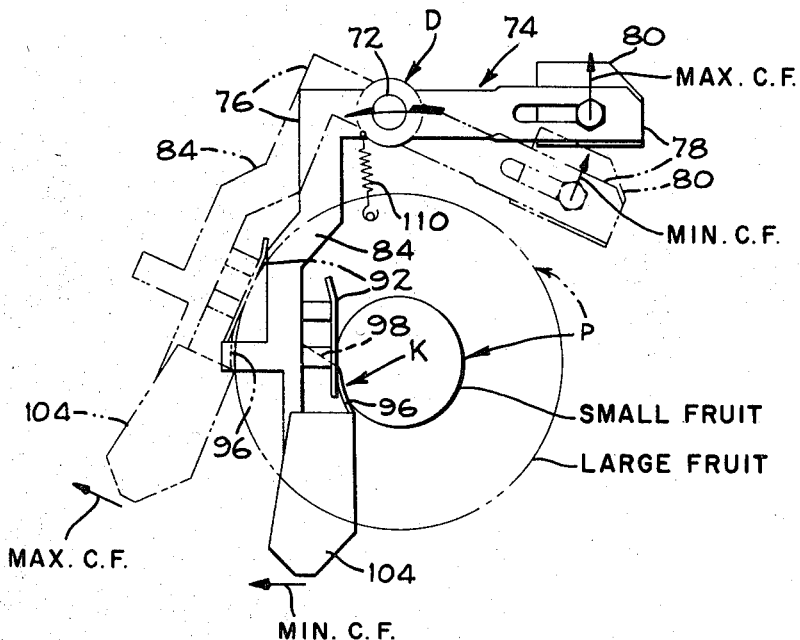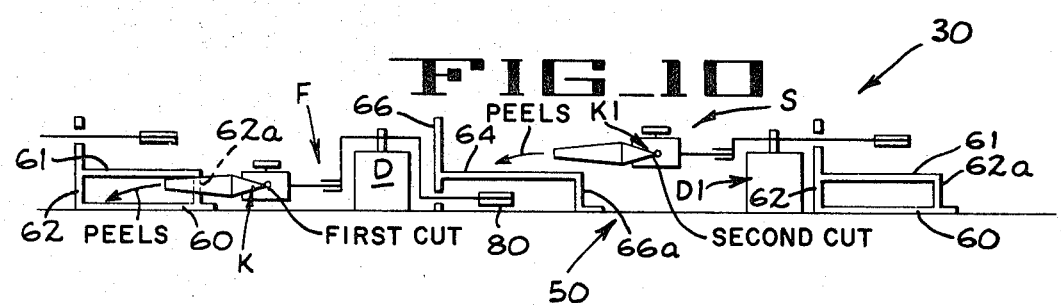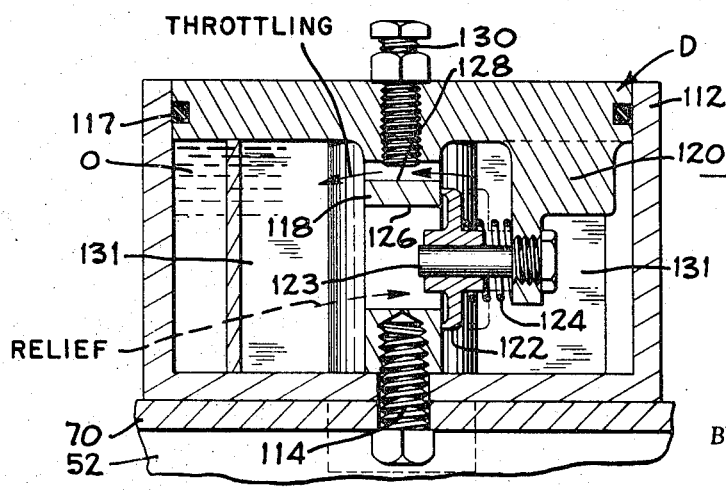

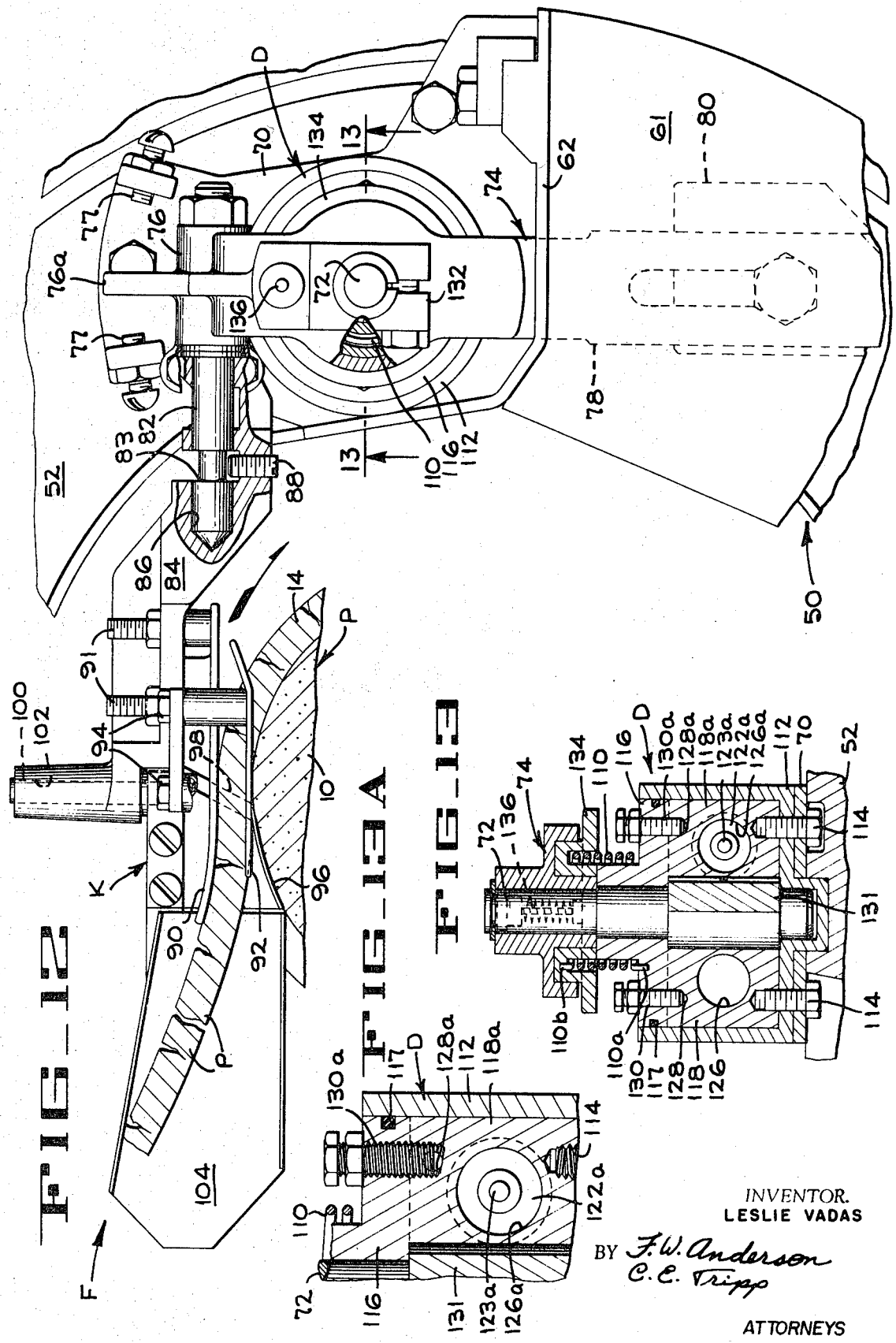

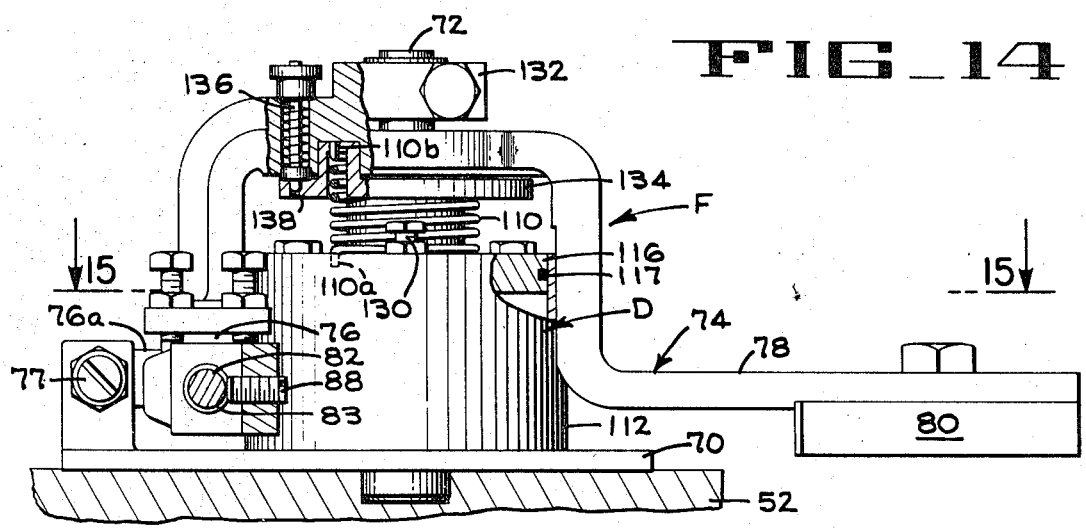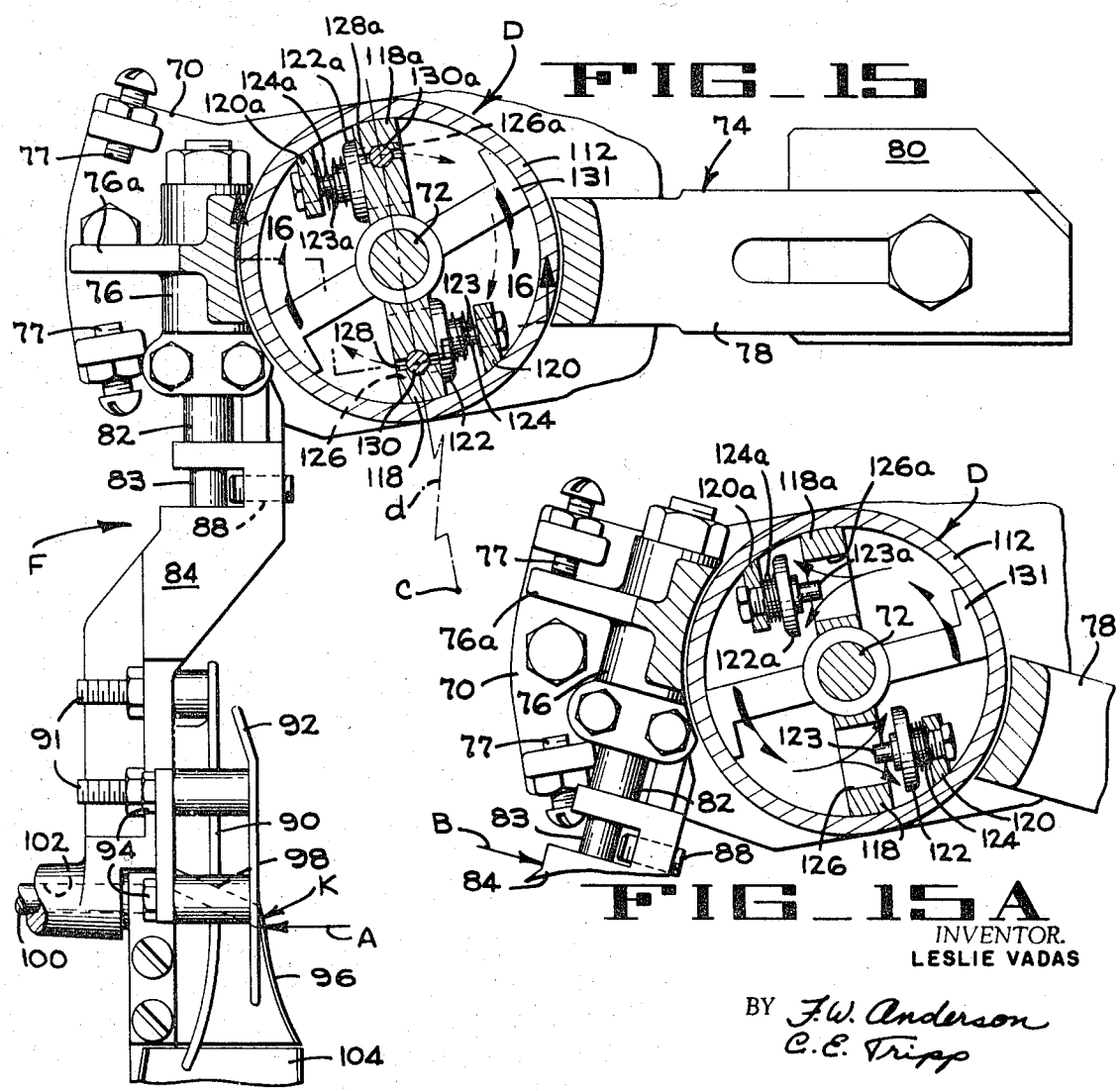

DAMPED ROTARY PEELING HEAD

BACKGROUND OF THE INVENTION

1. Field of the Invention

This invention relates to a rotary head for the contour peeling of fruit such as pineapples or the like, and more specifically is directed to an improvement in such heads wherein a hydraulic damper is mounted at the pivot point of the cutting knife of the peeling knife arm.

2. Description of the Prior Art

The contour peeling head of DeBack, Ser. No. 492,446 filed Oct. 4, 1965, now Pat. No. 3,382,900, issued May 14, 1968, represents the type of peeling head over which the head of the present invention is an improvement. In DeBack, the head is centrifugally counterbalanced at a nominal or intermediate pineapple diameter, and a spring supplies a force that always urges the knife against the fruit. Various fruit conditions cause the DeBack head to waste a certain amount of fruit.

The present head eliminates the need for overcutting and consequent waste of fruit, and it enters and leaves the fruit at the ends thereof without knife kickback. It peels cross-cored fruit, eccentrically cored fruit, and fruit of various shapes and sizes with improved efficiency, all as will be seen as the detailed description of the present invention proceeds.

SUMMARY OF THE INVENTION

The contour strip peeling of pineapples on a production basis using a rotary strip peeling knife, such as that of the aforesaid DeBack patent, is a sensitive operation that requires a refined, precision peeling head if it is to have optimum efficiency in the high volume pineapple industry. Contour peeling heads are inherently more economical of fruit flesh than are the standard Ginaca machines, as is well known, yet they have failed to have a profound impact on the industry. Contour heads such as that of DeBack should not only follow the contours of various sizes and shapes of fruits, including fruit that are cross cored and eccentric cored, but they must enter and leave the fruit at its ends, wherein the tough outer shell of the fruit must be initially incised in order to undercut the shell. Usually it is necessary to provide a contour peeling head which will peel fruit which has not been trimmed at one or both ends, thereby aggravating the problem. In any event, prior spring loaded knives "kickback" upon entry through the outer shell, but the present invention minimizes knife "kickback."

Furthermore, cross-cored and eccentrically cored fruit are often presented to the peeling head, resulting in rapid changes in radius. These also tend to fling the knife blades away from the fruit, and unless a strong return spring is provided, the cuts are uneven or too shallow in places. The provision of a return spring strong enough to insure removal of all of the eyes under these conditions results in an unnecessarily deep cut on symmetrical fruit, thereby wasting flesh. The same problem arises on fruit of non-spheroidal shape, lightly loaded knives have difficulty in following fruits of these contours.

As mentioned, the bell crank knife arm of DeBack is counterbalanced. The counterbalance arm urges that arm outwardly and the knife inwardly, and thus compensates for the effect of centrifugal force on the knife arm, which urges the knife away from the fruit. These centrifugal force effects can be adjusted to cancel at one, nominal fruit diameter. When peeling smaller fruit, the net effect of centrifugal force increases knife pressure, but the knife is easily caused to fly out under centrifugal force when peeling larger than normal fruit. The reduction in knife pressure on large fruit can be compensated by strengthening the spring that urges the knife against the fruit, but this overcuts large fruit, with attendant waste of flesh underneath the juice cut.

All of these problems are solved by the peeling head of the present invention which operates precisely and reliably at high speeds under the various conditions outlined above. The solution was found in the provision of a hydraulic damper, best located at the main, or fruit radius pivot of the bell crank knife arm. The damper is valved to permit the return spring to urge the peeling knife against the fruit without any substantial resistance from the damper. However, when the knife tends to be flung outwardly or to be kicked away from the fruit, the damper resists outward knife motion, but without causing gouging of the fruit. As the radius of the fruit decreases, an indication of eccentric coring, misshapen fruit, etc., the damper permits rapid inward knife motion under force of the spring, with reaccommodation to the fruit contour. Also, the fruit need not be trimmed at its ends in order to prevent kickback of the knife as it first enters the thick tough shell and as it leaves that shell. The damper efficiently resists such kickback, providing precisely controlled peels at the fruit ends, and under high speed production.

In accordance with the present invention, the hydraulic damper is disposed at the knife arm pivot, and hence centrifugal force acting on the damper (and on the hydraulic liquid therein) does not upset damper adjustment and operation. The damper has a winged vane mounted on the knife arm which oscillates with the bell crank. Relief and throttling valves in the housing are diametrically disposed relative to the rotor axis, and the oil flow through these valves is tangential to the direction of rotor rotation. Thus, the centrifugal force on the check valves is normal to their path of opening and closing, and neither urges these valves open nor closed. Similarly, the action of centrifugal force on the hydraulic liquid in the damper has no effective flow line component, and hence does not upset the calibration of the damper.

As a result of this invention fruits of various shapes and sizes, cored eccentrically, cross cored, and having untrimmed butt or crown ends or both, can be rapidly peeled on a production basis and without waste of flesh.

BRIEF DESCRIPTION OF THE DRAWINGS

FIG. 1 is a diagrammatic section showing the effect of overcutting during the juice cut.

FIG. 2 is a radial section showing the knife "kick zones" when entering the leaving a pineapple shell.

FIG. 3 is a section showing cross and eccentric coring of pineapples.

FIG. 4 is a diagram showing fruit sizes and variations in pineapples.

FIG. 5 is a vertical section through a peeling head embodying a present invention, viewed along 5–5 of FIG. 7.

FIG. 6 is a bottom plan view looking on line 6–6 of FIG. 5, showing the slitting arms.

FIG. 7 is a top plan of the peeling head rotor. FIG. 8 is a side view of the bell crank peeling arm, looking on line 8–8 of FIG. 7.

FIG. 9 is a section of the peeling knife leg looking on line 9–9 of FIG. 8, including a pineapple.

FIG. 10 is a laid out schematic showing the arrangement of first and second cut peeling assemblies.

FIG. 11 is a schematic showing the effects of centrifugal force on a counterbalanced bell crank arm peeling head.

FIG. 12 is an enlarged plan of the damper and peeling arm assembly embodying the invention, including a pineapple.

FIG. 13 is a section of the damper taken on line 13–13 of FIG. 12.

FIG. 13A is an enlarged detail of a check valve assembly.

FIG. 14 is an enlarged side view of a damper with parts broken away.

FIG. 15 is a section of the damper taken on line 15–15 of FIG. 14.

FIG. 15A is a section like FIG. 15 showing relief valve operation.

FIG. 16 is a section of the damper taken on line 16–16 of FIG. 15.

DESCRIPTION OF PREFERRED EMBODIMENT

Pineapple Problems

FIG. 1 illustrates the problem of overcutting, a characteristic of prior contour peelers of the type to which this invention relates.

The pineapple P includes the body of flesh 10 with a core hole 12 for handling. The shell 14 has eyes 16 which extend into an underlying layer of flesh 18, removed by the juice cut. Prior to the present invention, in order to insure that the juice cut will remove the eyes 16, it has been necessary to make the spring that urges the knives against the pineapple strong enough to overcut into the flesh, as indicated at 20, thereby insuring that the eyes will be removed. This overcut material represents a downgrading of the overall value of the pineapple in that the material of the overcut is processed along with the juice cut, instead of along with the flesh, the latter being the most valuable. The present invention makes it unnecessary to make any substantial overcut.

FIG. 2 illustrates the knife "kick zones," which cause problems in contour peeling. The core pin 22 is shown in the core hole 12, for moving the pineapple through the peeler. A bladed collar 24 assists in controlling the pineapple against rotation during peeling. A knife (illustrated diagrammatically in phantom) is shown as undercutting the shell 14. The blossom end knife kick zone 26 is that wherein the knife must initially cut through the shell 14, unless the pineapple has been trimmed along the plane 29. Similarly, there is a knife kick zone 28, at which the knife leaves the stem end of the pineapple, unless the pineapple has been trimmed along a trim plane 29a. These kick zones wherein the knife must be forced through the relatively hard shell (after which the going is easier) often causes the knife to be kicked away from the pineapple resulting in an irregular and unsatisfactory peeling at the ends. The damper of the present invention controls the knives at the kick zones so that the cut is regular between the trim planes 29,29a.

FIG. 3, shows two miscoring situations which cause problems in contour peeling. Eccentric coring is illustrated at 12 and cross coring is illustrated at 12a. Either type of coring renders the pineapple eccentric relative to the knives (the latter are rotated around the pineapple) and cause knife bounce and flutter. To successfully peel under these conditions requires an overcut such as that shown in FIG. 1, if all the eyes are to be removed.

FIG. 4 illustrates fruit sized variations encountered in contour peeling. There can be a range in fruit size from small to large and a spring force urging the knives against the fruit could be ideal for the small sized fruit but would be heavy for the large sized fruit resulting in an overcut such as that illustrated in 20 at FIG. 1. Also, as illustrated in FIG. 4, fruit of noncircular section or flattened, causes problems due to eccentricity, knife flutter, bounce, etc., all of which require an overcut to insure removal of the eyes. The knife assembly and damper of the present invention provides adequate removal of the eyes without overcut under fruit size variations such as those shown in FIG. 4.

General Construction of the Peeling Head

The peeling head of the present invention is like that of the aforesaid DeBack patent, except for the incorporation of the damper assembly of the present invention.

Referring generally to FIGS. 5—10. The pineapple is introduced vertically from beneath, as shown at the bottom of FIG. 5. The peeling head is generally annular and has a rotor mounted for rotation about the pineapple. The peeling head includes an annular base which is stationary and mounted on the machine frame (not shown). In order to assist in preventing rotation of the pineapple during peeling as well as to break up the peel strips into segments, the peeling head assembly 30 includes four slitting knives. These are mounted on the underside of the peeling head by means of arms 34 on peripheral axial pivots 36. The arms carry radially projecting blades 38, which make axial slits around the circumference of the pineapple P as it is forced upwardly through the peeling head assembly 30. The slitting blades are urged into the pineapple by tangential springs 40 (FIG. 6).

Projecting upwardly from the annular base 32 is a peel confining barrel 42 (FIGS. 5 and 7) having a radial opening 44 from which extend a first cut chute 46 and a second cut chute 48, for receiving peel segments. Rotating within the barrel 42 is a peeling rotor assembly indicated generally at 50, and having an annular base 52 (FIG. 5) mounted on bearings 54. The bearings run in an outer race 55 projecting upwardly from the fixed annular base 32. The rotor assembly 50 is rotated by a V-belt 56 and a drive motor, not shown.

As mentioned, the contour peeling is performed in two steps, a first cut which removes the outer shell and a juice cut which completes removal of the eyes (FIG. 1). Thus mounted on the peeling rotor assembly 50 is a first cut knife assembly F (which performs the shell cut) and a second cut knife assembly S (which performs the juice cut). Except for their relative axial positions, the knife assemblies F,S are substantially the same, and hence only the first cut assembly F need be described in detail. Elements of the second knife assembly S are given the same numbers as the corresponding elements of the first cut assembly F, with the addition of the letter "a." Reference is also made to the aforesaid DeBack patent for details of the knife assemblies.

Before describing the actual knife assemblies, reference will be made to the peel handling elements of the rotor assembly.

A first cut peel receiving plate 60 extends horizontally around about ¼ of the circumference of the rotor assembly (FIGS. 5, 7 and 10). A peel confining shroud 61 overlies the plate 60. The plates 60 and 61 are connected to end walls 62 and 62a which are mounted on the annular rotor base 52 and rotate therewith. At an elevation higher than that of the first cut peel receiving plate 60, is a second cut peel receiving plate 64 mounted on the rotating annular base 52 by means of end walls 66 and 66a FIGS. 7 and 10). With this construction, peels from the first cut knife assembly F are discharged onto the plate 60, beneath the plate 61 and out of the first cut chute 46 (FIGS. 5 and 7), via the opening 44 in the peel barrel 42. Peels from the second cut knife assembly S are discharged onto the upper peel receiving plate 64 and are discharged through the opening 44 in the barrel 42 to the second cut receiving chute 48.

The First Cut Knife Assembly

The first cut knife assembly F will be described in detail, the second cut knife assembly being essentially the same.

Reference is made generally to FIGS. 7—9 and 12—15. A mounting plate 70 is secured to the rotary annular base 52 (FIG. 5), and this plate mounts the damper assembly D (FIG. 13). The damper assembly D1 for the second cut assembly S is similarly mounted The damper rotary shaft 72 (FIGS. 7, 12 and 14) provides an axial or peel radius pivot for the knife assembly, and mounts a bell crank arm 74 having a knife mounting leg 76 and a counterbalance leg 78. As seen in FIG. 12 stops are provided for limiting motion of the arm 74 in the form of a stop ear 76a on the knife mounting leg and adjustable stops 77 projecting upwardly from the mounting plate 70. A counterweight 80 is adjustably mounted along the counterbalance leg 78.

The knife unit for the first cut assembly F is indicated generally at K and the knife unit for the second cut assembly S is indicated at K1. Only the knife unit K need be described, the knife unit K1 being a duplicate thereof. The knife unit K is mounted on a tangential pivot pin 82 (FIG. 12) which is grooved at 83 and which forms a terminal portion of the knife mounting leg 76. A knife mounting arm 84 is provided with a socket 86 which receives the tangential pivot pin 82. A setscrew 88 in the knife arm 84 projects into the pivot groove 83 for retaining the knife arm in place while accommodating swiveling of the knife arm 84 about the tangential pivot 82.

The knife arm 84 mounts a shoe 90 which engages a periphery of the pineapple shell when making the first cut and which engages the underlying portion of the pineapple on the second cut assembly K1. The shoe 90 is retained on the knife arm 84 by bolt assemblies 91.

In order to regulate the depth cut, a gauge 92 is also mounted on the arm 84 by means of bolt assemblies 94 (FIGS. 9, 12 and 15).

As explained in the aforesaid DeBack patent, the cutting portions of the knife include a triangular undercutting knife blade 96 which cuts axially of the pineapple, and a slitting knife blade 98 which projects radially into the pineapple for circumferentially slitting the undercut portions into strips or peels. These knife elements, 96, 98 are mounted on a radial pivot 100 (FIGS. 9 and 12) received in a socket 102 formed in the knife arm 84. The shoe 90 is notched at 103 (FIG. 8) to accommodate pivotal motion of the knife elements about the pivot 100. A peel distributing chute 104 projects circumferentially rearwardly from the knife elements 96,98.

The operation of the knife unit itself is like that of the DeBack patent, and will only be mentioned briefly. As pineapples are pushed up through the peeling head (FIG. 5) which rotates in the direction of the arrow shown in FIG. 7, the shell 14 (in the instance of the first cut assembly) is undercut by the triangular knife blade 96 as best seen in FIG. 12. FIG. 9 is taken at the point of the blade, so that the rest of the blade, shown in phantom, curves around to the right. A spring, to be described presently, urges the knife against the pineapple. The axial pivot 72 accommodates variations in pineapple radius.

The depth gauge 92 (FIG. 12) determines the depth of cut. The tangential pivot 82 accommodates swinging of the knife assembly on a generally horizontal axis, so that the triangular knife section 96 can follow the vertical pineapple contour lines.

The peel slitting knife element 98 extends through the shell in a generally horizontal plane and intersects the vertical cut made by the triangular knife 96, thus freeing a strip of peel p, (FIGS. 9 and 12). The radial pivot 100 permits the slitting knife 98 to assume a helix angle as the pineapple is moved upward, so that the cut around the pineapple is a helical cut. The slitting blades 38 not only prevent the pineapple from rotating, but interrupt the peels p so that they come off in short lengths. Centrifugal force urges the peels out of the chute 104 onto the chute receiving plate 60 (FIGS. 7 and 10) and hence out of the first cut chute 46 (FIGS. 5 and 7). Having described the salient features of the contour peeling head incorporated in the present invention, the damper system of the present invention will now be described in detail.

Counterbalance System

The first cut damper D and the second cut damper D1 are identical in construction and only the damper D will be described in detail. A number of problems presented in contour pineapple peeling and solved by the damper of the present invention have been mentioned. A problem presented by the centrifugally counterbalanced knife assembly just described can best be explained in connection with FIG. 11. This problem will be briefly mentioned before the details of the damper are explained.

FIG. 11 shows the bell crank knife assembly like that just described operating on small fruit (solid lines) and large fruit (broken lines). When peeling small fruit, the counterweight 80 is at its larger radius and the knife leg of the bell crank, to be characterized by the peel delivery chute 104, is at its smaller radius. This provides a maximum centrifugal force (C.F.) from the counterweight 80 and a minimum centrifugal force from the knife leg. The adjustment of the counterweight is such that the net centrifugal force is positive, thus urging the depth gauge 92 and the knives 96,98 against the pineapple.

When operating on large fruit, the counter weight 80 is at its smaller radius (Min. C.F.), whereas the knife leg is at its larger radius (Max. C.F.).

On large fruit, the counter weight adjustment is such that centrifugal force on the knife leg predominates, so that centrifugal force alone is negative, and urges the knife away from the fruit. In practice, the counter balance 80 is adjusted so that the two centrifugal forces balance out at an intermediate diameter (not shown) between the largest and smallest fruit encountered.

The basic cutting pressure is provided by a spring illustrated schematically at 110 in FIG. 11, connected to urge the knife against the fruit. In prior knife assemblies, this spring must not only overcome the negative centrifugal force effect on large fruit, it must be strong enough to compensate for all the various factors that cause knife flutter, bounce, kick back, etc. Thus, an overcut is produced. As will be seen, the spring 110 of the present invention can be weaker than prior springs, thereby reducing over cutting and consequent waste of valuable pineapple flesh, but without loss of control.

DAMPER CONSTRUCTION

Both dampers D and D1 are of the double vane hydraulic type with one way relief action on inward knife motion and throttling (damping) action on outward knife motion.

The damper D has a cup shaped housing 112 fastened to the knife assembly mounting plate 70 by screws 114 (FIG. 13). A cover plate 116 FIGS. 13, 14 and 16) closes the top of housing 112 and is sealed thereto by an O-ring 117 (FIG. 13). The housing 112 and the cover plate 116 cooperate to provide a hydraulic chamber.

Depending from the cover plate 116 are diametral partitions 118,118a which are disposed on a diameter d of the to rotor which passes through the center c of the peeling head (FIGS. 7 and 15). This diametral disposition of the partitions is a feature of the present invention. Also depending from the cover 116 are relief valve mounting ears 120,120a (FIGS. 15 and 16) mounting relief valves 122,122a on pins 123,123a. The relief valves are urged by springs 124,124a to close ports 126,126a in the partitions 118,118a.

The partitions 118,118a also are pierced with throttling ports 128,128a (FIGS. 13, 13A and 15) which bypass a metered quantity of oil on (FIGS. throttling (knife moving out) stroke of the damper. The area of the throttling ports 128,128a is adjustable by metering screws 130,130a (FIGS. 13,13A).

Oil transfer through the release and throttling ports is effected by a double acting a vane 131, having radial wings projecting from the pivot shaft 72 (FIGS. 15 and 15A). The peripheral edges of the vanes make a nice fit with the inner wall of the housing 112 so that oil (indicated at 0 at the upper left of FIG. 16) is trapped between the vanes and the partitions 118,118a.

The bell crank arm itself is clamped to the pivot (damper vane) shaft 72 by a split clamp construction 132 (FIGS. 12 and 14). This permits the vane to be centered between between the partitions 118, 118a when the bell crank arm is at some nominal position.

Mention has been made of a spring 110 (FIG. 11) which urges the knives towards the pineapple. In the actual device, the spring 110 is a helical torsion spring connected between the bell crank arm 74 and the damper housing 112. Means are provided for adjusting the force of this spring for optimum action at a nominal pineapple diameter, as previously described. This construction can be described as follows:

The spring 110 has a lower leg 110a (FIG. 14) that projects into a socket in the cover 116 of the damper, and an upper leg 110b that projects into a socket in a windup collar 134. The position of the collar 134 relative to the damper housing determines the torsion force of the spring 110. The collar 134 is rotatably mounted in the bell crank arm 74 and is retained in a selected position by a spring loaded keeper latch 136. The lower end of the latch pin projects into any one of a number of holes 138 in the collar 134, (FIG. 14). Thus the pressure on the knife against the fruit can be set for an optimum value at some nominal fruit diameter by adjusting the counter weight 80 and by adjusting the windup collar 134 as just described.

As seen in FIG. 11, the effect of the counter weight 80 in urging the knife against the pineapple is reduced on large fruit. However, this represents the very condition wherein the spring loading by the torsion spring 110 is a maximum, so that these effects are offset to some degree. Even so, due to the negative centrifugal force on large fruit, the knife unit is sensitive to kick back, but the damper prevents that action. Also, the damper of the present invention is necessary due to the various anomalous conditions often encountered in a production run of pineapple, as previously explained.

The damper prevents flutter and rapid motions of the knife radially outwardly, that is, away from fruit while accommodating radially inward motions of the knife necessary to follow the fruit contour of size variations, eccentricities, etc. These actions are shown in FIGS. 15 and 15A. In FIG. 15 it will be assumed that a force A is suddenly applied, urging the knife away from the fruit. This causes the vane 131 to rotate clockwise as indicated by the arrows. Oil trapped between the vane and the partitions 118,118a cannot pass through the relief ports 126,126a because these will be closed by the relief valves 122,122a. However, a metered amount of oil can pass through the throttling ports 128,128a, the amount of flow depending upon the adjustment of the metering screws 130,130a. The throttling (resistance) action increases as the velocity with the vanes increases thereby resisting sudden kick back or fluttering motions of the knives in the outward direction. The relief valves automatically accommodate the slow, steady knife motion necessary for following the contour of the pineapple. The damper assemblies serve the purpose of preventing sudden outward motion of the knife (away from the pineapple), while permitting the spring strings 110 to steadily maintain the knives against the pineapple.

FIG. 15A shows the operation of the damper assembly while a force B is urging the knife against the pineapple. This force is due to the spring 110, plus any net centrifugal force resulting from the action of the counterweight 80. Motion of the knives toward the pineapple rotate the vane 131 counterclockwise, as indicated by the arrows in FIG. 15A. Oil trapped between the vane wings and the partitions 118,118a forces the relief valves 122, 122a open, thereby accommodating virtually unrestricted or relief flow of oil through their ports 126,126a. Oil is merely translated from one side of each partition to the other, with very little throttling action and, the action of the spring 110 is substantially unaffected by the damper. As a result, the depth gauge 92 need not be set to produce an over cut, yet the juice cut will remove the eyes under varying conditions.

The diametral disposition of the particles 118, 118a and the tangential location of the relief valves mounting pins 123,123a minimize the effect of centrifugal force on the damper assemblies. With diametral partitions, centrifugal force does not urge the oil trapped between the vanes and the partitions to flow one way or another through the ports in those partitions. With a tangential disposition of the mounting pins for the relief valves 122,122a, centrifugal force on those valves has virtually no component in their direction of motion and hence does not urge them opened or closed. Thus, the relief valve springs 124, 124a need not be strong, making the damper sensitively responsive to the force of the spring 110.

Having completed a detailed description of the invention, it can be seen position of a two-way damping construction mounted in the manner shown and described permits high speed contour peeling without over cutting, skipping, knife fly back, etc., all as previously described.

Although the best mode contemplated for carrying out the present invention has been herein shown and described, it will be apparent that modification and variation may be made without departing from what is regarded to be the subject matter of the invention as set forth in the appended claims.

I claim:

1. A rotary head for contour peeling fruit such as pineapples or the like, said head comprising a base, a rotor on said base, said base and rotor providing an opening through which the fruit can pass for peeling, a knife arm having a fruit radius pivot shaft on said rotor and disposed to one side of said fruit opening, said knife arm having a knife mounting leg extending across said fruit opening and a counter balance leg extending generally tangent to the rotational path of said pivot shaft, spring means for urging the knife mounting leg inwardly toward the fruit, and a substantially unidirectional hydraulic damper for hydraulically resisting outward motion of said knife mounting leg while substantially freely accommodating inward motion thereof, said damper comprising a vane mounted directly on said knife arm pivot shaft, a liquid filled housing on said rotor, liquid blocking partition means in said housing cooperating with said vane, port means in said damper for throttling liquid flow upon outward motion of said knife mounting leg, and relief valve means in said partition means for accommodating liquid flow upon inward knife motion.

2. The peeling head of claim 1, wherein the opening and closing motion of said relief valve means is substantially tangential to the path of rotation of said rotor for minimizing the effect of centrifugal force on the relief valve means.

3. The peeling head of claim 1, wherein said vane is double acting and said partition means comprises radially disposed partition elements, said relief valve means comprising a port in each partition element and a valve member mounted at each port for opening and closing motion in a generally tangential direction.

4. A rotary head for contour peeling fruit such as pineapples or the like, said head comprising a base, a rotor on said base, said base and rotor providing an opening through which the fruit can pass for peeling; a damper on said rotor comprising concentric, relatively rotatable pivot shaft and housing elements disposed at one side of said fruit opening with one of said elements being fixed on the rotor, a knife arm on said rotatable damper element and having a knife mounting leg extending across said fruit opening and a counter balance leg extending generally tangent to the rotational path of said pivot, spring means for urging the knife mounting leg inwardly toward the fruit; said damper comprising double acting vane means mounted directly on the movable damper element and liquid blocking partition means on the fixed damper element, a liquid in said damper housing element, port means in one of said damper elements for throttling liquid flow upon outward motion of said knife mounting leg, and relief valve means for accommodating inward knife motion; said fixed partition means comprising aligned walls radially disposed relative to the rotor center, said relief valve means comprising relief valve ports formed in said fixed radial walls, and a relief valve member mounted at each port for opening and closing motion in a direction that is generally tangential to the path of rotor rotation.